US006488077B1

(12) United States Patent
Arold

(10) Patent No.: US 6,488,077 B1
(45) Date of Patent: Dec. 3, 2002

(54) HEATING OR AIR-CONDITIONING SYSTEM

(75) Inventor: Klaus Arold, Sindelfingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/289,060

(22) Filed: Apr. 12, 1999

(30) Foreign Application Priority Data

Apr. 11, 1998  (DE) ......................................... 198 16 322

(51) Int. Cl.⁷ ............................................... F25B 29/00
(52) U.S. Cl. .......................... 165/42; 165/43; 165/203; 165/103; 454/156; 454/160; 454/161; 237/12.3 A; 237/12.3 B
(58) Field of Search ........................... 165/42, 43, 203, 165/103; 454/156, 160, 161; 237/12.3 A, 12.3 B

(56) References Cited

U.S. PATENT DOCUMENTS

| 4,852,638 A | * | 8/1989 | Hildebrand et al. | .......... 165/43 |
| 4,972,992 A | * | 11/1990 | Scheidel et al. | .............. 165/42 |
| 5,016,704 A | | 5/1991 | Ono | ............................. 165/42 |

FOREIGN PATENT DOCUMENTS

| DE | 3514359 | * | 10/1986 | ................. 165/203 |
| DE | 198 04 287 C1 | | 3/1999 | |
| GB | 2 100 417 A | | 12/1982 | |
| JP | 0051615 | * | 4/1980 | ................... 165/43 |
| JP | 0053224 | * | 3/1984 | ................... 165/43 |

OTHER PUBLICATIONS

Abstract of JP 62091305 and Figure (Apr. 1987).
Abstract of JP 60008107 and Figure (Jan. 1985).

* cited by examiner

Primary Examiner—John K. Ford
(74) Attorney, Agent, or Firm—Crowell & Moring LLP

(57) ABSTRACT

The invention relates to a heating or air-conditioning system and method for ventilating an occupant compartment of a vehicle having a climatic box in which a heat exchanger is accommodated, through which air can flow, and in which at least one air mixing chamber is constructed, which has an air inflow opening for warm air flowing through the heat exchanger and an air inflow opening for cold air flowing around the heat exchanger as well as outlet openings for mixed air, of which at least one outflow opening is arranged on the bottom in the air mixing chamber and at least one outflow opening is arranged on top in the air mixing chamber, and having closing members controlling the opening cross-sections of the inflow openings. For achieving a temperature gradient between the lower and the upper outflow opening, the closing member for the cold-air inflow opening is constructed in two parts such that an upper closing member part completely covers the upper dimension area and a lower closing member part completely covers the lower dimension area of the cold-air inflow opening, and the two closing member parts are controlled such that, in every closing member position, the lower closing member part covers a larger opening cross-section of the cold-air inflow opening than the upper closing member part.

11 Claims, 1 Drawing Sheet

HEATING OR AIR-CONDITIONING SYSTEM

BACKGROUND AND SUMMARY OF THE INVENTION

This application claims the priority of 198 16 332.0-16, filed Apr. 4, 1998, the disclosures of which is expressly incorporated by reference herein.

The invention relates to a heating or air-conditioning system for ventilating an occupant compartment of a vehicle, and more particularly, to a system for ventilating several different areas in the occupant compartment.

In a known type of heating or air-conditioning system as disclosed in U.S. Patent Document U.S. Pat. No. 5,016,704, a closing member for controlling the cold-air inlet opening is constructed as a swivellable air flap which, in its one swivelling end position, completely covers the cold-air inlet opening and, in its other swivelling end position, while simultaneously opening up the cold-air inflow opening, completely covers the air inlet surface of the heat exchanger. As the result of a suitable swivelling position of the air flap, the warm-air and cold-air flows flowing into the air mixing chamber can be adjusted such that the mixed air in the distributor chamber has a desired temperature. By way of the various mixed-air outlet openings, this air is distributed to the foot space, the center plane and the head area of the occupant compartment, in which case the air quantities for the individual zones can be apportioned by means of adjusting flaps assigned to the mixed-air outlet openings. In this case, all zones of the vehicle occupant compartment receive air which has the same temperature.

It is important for the vehicle occupant's well-being to keep the temperature of the temperature-adjusted air flowing into the center plane and the head area lower than the temperature of the air flowing into the foot space. In order to achieve this, it was suggested in earlier German Patent Application 198 04 287.6, to provide an additional cold-air duct which leads into an air duct leading away from the mixed-air outlet opening for the center plane and can be controlled by means of an air flap. By a corresponding opening-up or closing of the air flap, more or less cold air can be added to the mixed air flowing out of the mixed-air chamber, and the temperature of the air flowing into the center plane can thus be lowered to a higher or lower degree in comparison to the temperature of the foot space air.

It is an object of the present invention to implement, in the case of a heating or air-conditioning system of the initially mentioned type, at low technical expenditures, a temperature reduction of the air flowing into the center plane and/or into the head area of the vehicle occupant compartment in contrast to the air reaching the foot space and therefore lower the manufacturing costs of the system.

In the case of a heating or air-conditioning system according to the present invention, this object is achieved by means of a cold air inflow opening that extends over an upper and lower area of a mixed air outlet opening. A two part closing member is provided for the cold air inflow opening. An upper part of the closing member can completely cover an upper dimension area and a lower part of the closing member can completely cover a lower dimension area of the cold air inflow opening. The two parts of the closing member are controlled such that the lower part covers a larger opening cross-section of the cold air inflow opening than the upper part at any position of the closing member.

The heating or air-conditioning system according to the invention has the advantage that, as the result of the division of the closing member for the cold-air inlet opening of the air mixing chamber and the controlling of the closing member parts such that the lower closing member part always covers a larger opening cross-section of the cold-air inlet opening than the upper closing member part, less cold air always enters into the lower area of the air mixing chamber in which the outlet opening for the foot space is arranged than into the upper area of the air mixing chamber in which the outlet opening for the center plane and/or the head area is arranged. As a result, a temperature stratification occurs in the air mixing chamber which has a temperature gradient from the air outlet opening for the foot space to the outlet opening for the center plane and/or the head area. The center plane and/or the head area are always supplied directly from the air mixing chamber with air adjusted to a lower temperature than the foot space. Additional devices, such as a cold-air duct with a control flap, can be eliminated so that the manufacturing expenses are reduced by the elimination of these components.

According to advantageous embodiments of the invention, the two closing member parts can each be driven by a separate adjusting element or can be rigidly synchronized with one another or mechanically coupled. In the former case, the temperature stratification in the air mixing chamber can be individually adjusted; in the latter case, the air stratification is defined according to the concept.

According to a preferred embodiment of the invention, a partition, which divides the cold-air inflow opening, is arranged between the two closing member parts. The partition continues into the air mixing chamber to its rear wall situated opposite the cold-air inflow opening and separates the upper and lower mixed-air outlet openings from one another. Preferably, the partition divides the air mixing chamber only in the area of the two closing flap parts and not completely. By means of this constructive measure, a very good air stratification in the air mixing chamber between the lower and the upper air outlet opening for the foot space and the center plane and/or the head area can be achieved at low technical expenditures.

BRIEF DESCRIPTION OF THE DRAWINGS

The invention will be described in detail in the following by means of an embodiment illustrated in the drawing.

DETAILED DESCRIPTION OF THE DRAWINGS

Figure 1:
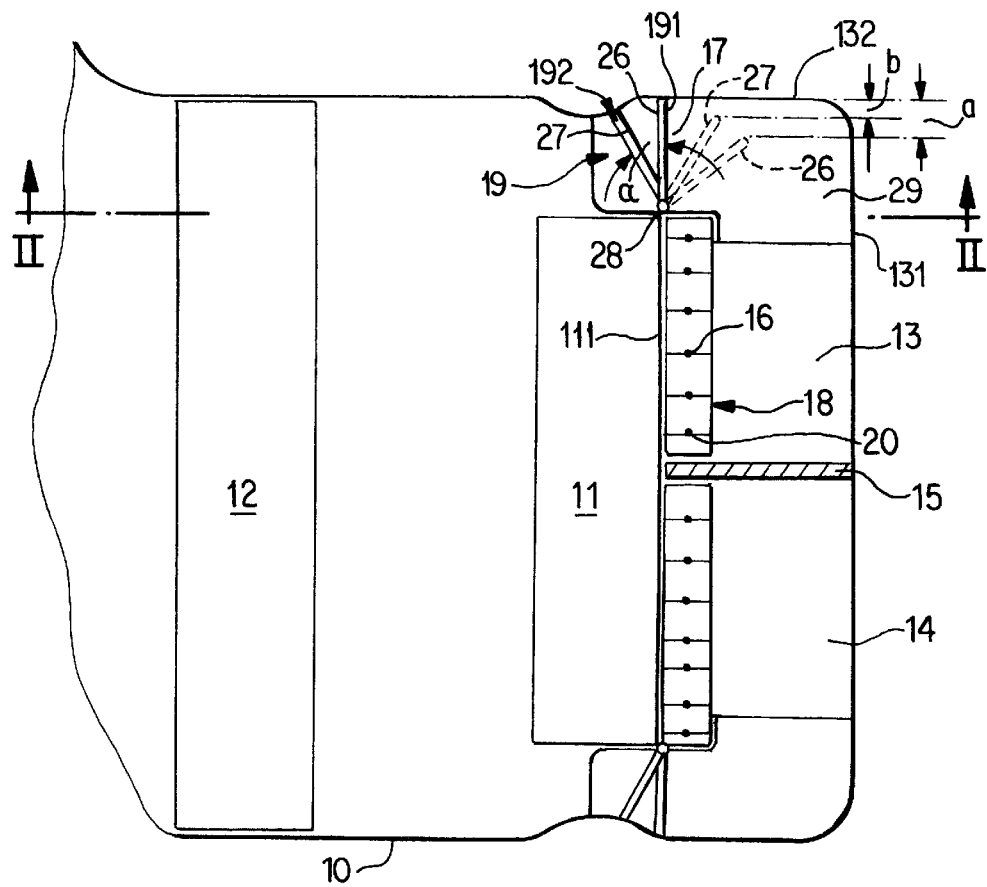
FIG. 1 is a schematic view of a horizontally extending cross-section of a climatic box of a heating or air-conditioning system.

The climatic box 10 of a heating or air-conditioning system is illustrated in a schematic sectional top view in FIG. 1. Climatic box 10 is connected on the input side in a known manner to a fan which is not shown here. The climatic box 10 contains a heat exchanger 11, through which air can flow and in front of which, in the construction as an air conditioner, an evaporator 12 is arranged viewed in the air flow direction. A heating medium flows in a known manner through the heat exchanger 11, for the purpose of which the cooling water of the internal-combustion engine of a vehicle is normally used.

In the air flow direction behind the heat exchanger 11, two air mixing chambers 13, 14 are constructed in the climatic box 10. Air mixing chambers 13, 14 are arranged side-by-side and are separated by a partition 15. The air mixing chambers 13, 14 are used for air supply to the right and left side of the vehicle occupant compartment of the vehicle. The air mixing chamber 13, 14 have an identical construction and are equipped with identical elements for controlling the air so that in the following description, reference will only be made to the air mixing chamber 13, but the same statements also apply to the air mixing chamber 14.

Figure 2:
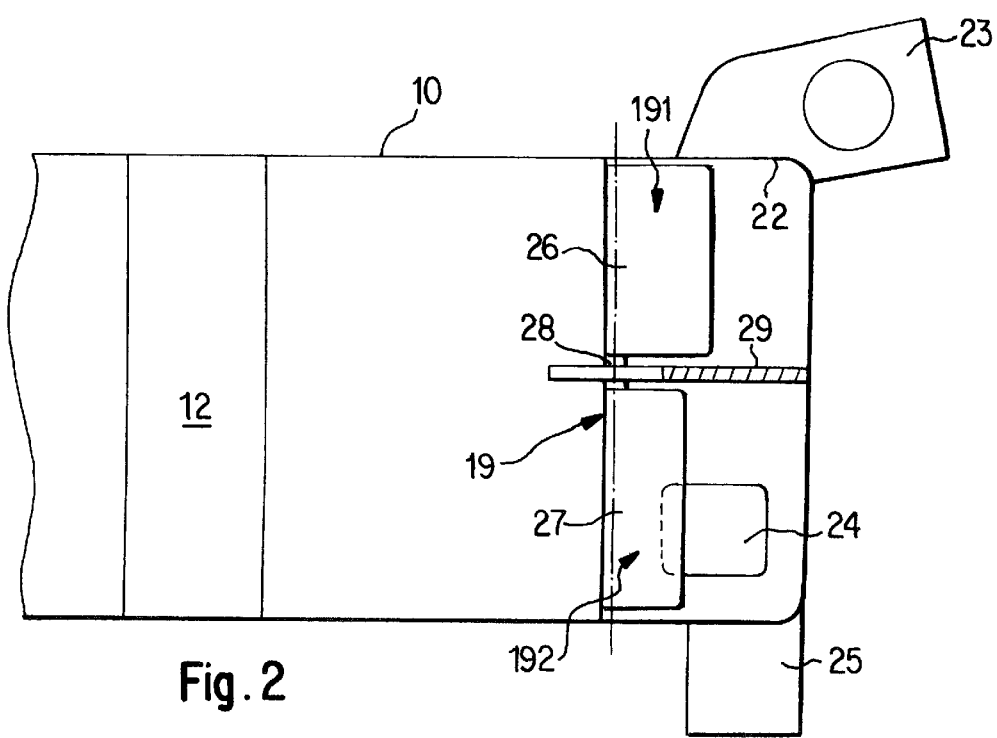
FIG. 2 is a schematic sectional view along Line II—II in FIG. 1.

The air mixing chamber 13 has a warm-air inflow opening 16, which is arranged behind the heat exchanger 11 and which is tapped directly on the air outlet surface 111 of the heat exchanger 11. A cold-air inflow opening 17 is arranged laterally of the heat exchanger 11 through which the cold air which comes directly from the evaporator 12 and flows around the heat exchanger 11 can flow into the air mixing chamber 13. Each inflow opening 16, 17 is provided with a closing member 18, 19 for controlling the opening cross-section of the inflow opening 16, 17. In the embodiment of FIG. 1, the closing member 18 for the warm-air inflow opening 16 is constructed as a space-saving shutter-type closure 20 with a plurality of narrow swivel lamellae which are arranged side-by-side and, in their totality, are capable of covering the warm-air inflow opening 16. In the following, the closing member 19 for the cold-air inflow opening 17 will be described in greater detail. For the ventilating of the vehicle occupant compartment by means of the temperature-adjusted air, the air mixing chamber 13 has several outflow openings which continue in air outflow connection pieces for connecting air ducts leading into different areas of the vehicle occupant compartment. Thus, the outflow opening 22 with the adjoining connection piece 23 (FIG. 2) which is arranged on top in the air mixing chamber 13 is used for supplying air to the center plane and/or the head area of the vehicle occupant compartment, specifically for the right half of the vehicle occupant compartment. The outflow opening 24 with the assigned connection piece 25 which is arranged on the bottom in the air mixing chamber 13, is used for ventilating the foot space and/or the rear in the right side of the vehicle occupant compartment. The air mixing chamber 14 has corresponding outflow openings and connection pieces for ventilating the left side of the vehicle occupant compartment.

Both air inflow openings 16, 17 have a large-surface construction and extend along the area of the upper outflow opening 22 as well as along the area of the lower outflow opening 24. The closing members 18, 19 for controlling the air inlet cross-section of the inflow openings 16, 17 have a correspondingly large-surface construction. For achieving a temperature stratification in the air mixing chamber 13 with a temperature gradient from the bottom to the top, thus from the area of the lower outflow opening 24 to the upper outflow opening 22, the closing member 19 is constructed in two parts. An upper closing member part 191 can completely cover the upper dimension area and a lower closing member part 192 can completely cover the lower dimension area of the cold-air inflow opening 17. The two closing member parts 191, 192 are controlled such that, in every position of the closing member 19, the lower closing member part 192 covers a larger opening cross-section of the cold-air inflow opening 17 than the upper closing member part 191. In the illustrated embodiment, the two closing member parts 191, 192 are constructed as air flaps 26, 27 which are disposed on a common swivel shaft 28 swivellably disposed in the climatic box 10. In this case, the two air flaps 26, 27 are rotated against one another about a fixed swivel angle $\alpha$ and are rigidly connected with one another by way of the swivel shaft 28. As illustrated in FIG. 1, during the opening movement of the closing member 19, the upper air flap 26 always moves ahead of the lower air flap 27 by this constant swivel angle $\alpha$. As such, in each swivelling position, the lower air flap 27 always covers a larger opening cross-section of the cold-air inflow opening 17 than the upper air flap 26. In FIG. 1, the closing position of the closing member 19 is shown by a solid line and a swivelling position of the closing member 19 during the opening movement is illustrated by a broken line. In this swivelling position, the upper air flap 26 exposes the opening cross-section a of the cold-air inflow opening and the lower air flap 27 exposes the opening cross-section b of the cold-air inflow opening 17. Thus, in every swivelling position, more cold air enters in the upper dimension area of the cold-air inflow opening 17 than in the lower dimension area of the cold-air inflow opening 17 and the endeavored temperature stratification occurs with the temperature gradient from the bottom to the top.

For improving this air stratification, a partition 29 is arranged between the upper air flap 26 and the lower air flap 27 and horizontally divides the cold-air inflow opening 17 and continues in the air mixing chamber 13 to its wall 131 situated opposite the cold-air inflow opening 17. The partition 29, which extends only through a portion of the air mixing chamber 13 and reaches to the side wall 132 of the air mixing chamber 13, in which the two outflow openings 22, 24 for the mixed air are arranged, therefore blocks the direct air path between the two mixed-air outflow openings 22, 24. Accordingly, in the case of a mixed-air adjustment, the warmer air is situated below the partition 29 and the colder air is situated above the partition 29 and can mix only by flowing around the partition.

The invention is not limited to the described embodiment. Thus, the two air flaps 26, 27 must not be rigidly connected with one another by way of a common driven swivel shaft 28, but a separate actuating drive can be assigned to each air flap 26, 27, the actuating drives being controlled either synchronously or individually.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Heating or air-conditioning system for ventilating an occupant compartment of a vehicle, comprising:
    a climatic box having a heat exchanger accommodated therein through which air can flow, in which is arranged:
        at least one air mixing chamber having a warm air inflow opening for warm air flowing through the heat exchanger, a cold air inflow opening for cold air flowing around the heat exchanger, and outflow openings for the mixed air, at least one of the outflow openings is arranged on bottom in the air mixing chamber for ventilating at least one of a foot space and a rear of the occupant compartment, and at least one outflow opening is arranged on top in the air mixing chamber for ventilating at least one of the center plane and the head area of the occupant compartment; and
    closing members for controlling the opening cross-sections of the inflow openings, wherein the cold-air inflow opening extends over an area of the upper as well as over an area of the lower mixed-air outflow openings, and the closing members for the cold-air inflow opening are constructed in two parts such that an upper closing member part is capable of completely covering an upper dimension area of the cold-air inflow opening and stopping flow therethrough and a lower closing member part is capable of completely covering a lower dimension area of the cold-air inflow opening and stopping flow therethrough, and the two closing member parts are controlled such that the lower closing member part in every closing member position covers a larger opening cross-section of the cold-air inflow opening than the upper closing member part.

2. Heating or air-conditioning system according to claim 1, wherein a partition, which divides the cold-air inflow opening is arranged between the two closing member parts, the partition extends into the air mixing chamber to a rear wall thereof situated opposite the cold-air inflow opening and separates the upper and the lower mixed-air outflow openings from one another, the partition does not completely divide the air mixing chamber.

3. Heating or air-conditioning system according to claim 1, wherein movement of the two closing member parts is synchronized such that a difference in a degree of covering the upper and the lower dimension area of the cold-air inflow opening by the closing member parts is constant in any closing member position.

4. Heating or air-conditioning system according to claim 3, wherein the two closing member parts are constructed as air flaps, which can be swivelled about a common swivel axis, and the two air flaps are angularly offset by a swivel angle and are fixedly connected with one another.

5. Heating or air-conditioning system according to claim 4, wherein the two air flaps are non-rotatably arranged on the swivel shaft which is swivellably disposed in the climatic box.

6. Heating or air-conditioning system according to claim 2, wherein movement of the two closing member parts is synchronized such that a difference in a degree of covering the upper and the lower dimension area of the cold-air inflow opening by the closing member parts is constant in any closing member position.

7. Heating or air-conditioning system according to claim 6, wherein the two closing member parts are constructed as air flaps, which can be swivelled about a common swivel axis, and the two air flaps are angularly offset by a swivel angle and are fixedly connected with one another.

8. Heating or air-conditioning system according to claim 7, wherein the two air flaps are non-rotatably arranged on the swivel shaft which is swivellably disposed in the climatic box.

9. A ventilation system for ventilating an occupant compartment of a vehicle, comprising:
a climatic box in which is positioned:
a heat-exchanger through which air flows;
at least on e air mixing chamber having a warm air inflow opening for warm air flowing through the heat exchanger and a cold air inflow opening for cold air flowing around the heat exchanger; and
outflow openings for mixed air, at least one of the outflow openings being arranged on a bottom of the air mixing chamber for ventilating at least one of a foot space and a rear of the occupant compartment, and at least one outflow opening being arranged on a top of the air mixing chamber for ventilating at least one of the center plane and the head area of the occupant compartment; and
at least one closing member for controlling the opening cross-sections of the warm air and cold air inflow openings, wherein the cold-air inflow opening extends over an upper and lower area of the mixed-air outflow openings, and wherein the at least one closing member for the cold-air inflow opening is constructed in two parts including an upper closing member part for completely covering an upper dimension area of the cold-air inflow opening and stopping flow therethrough and a lower closing member part for completely covering a lower dimension area of the cold-air inflow opening and stopping flow therethrough, the two closing member parts being controlled such that the lower closing member part covers a larger opening cross-section of the cold-air inflow opening than the upper closing member part in every position of the at least one closing member.

10. A method for mixing warm and cold air in a ventilation system for ventilating an occupant compartment of a vehicle, comprising the steps of:
positioning a climatic box in a ventilation system, the climatic box including:
a heat exchanger through which air flows in the climatic box;
at least one air mixing chamber at the rear side of the heat exchanger in an air flow direction, the mixing chamber further comprises;
at least one warm air inflow opening for warm air flowing through the heat exchanger,
at least one cold air inflow opening for cold air flowing around the heat exchanger,
at least one outflow opening for mixed air arranged on a bottom of the air mixing chamber for ventilating at least one of a foot space and a rear of the occupant compartment,
at least one outflow opening for mixed air arranged on a top of the air mixing chamber for ventilating at least one of the center plane and the head area of the occupant compartment, and
at least one closing member for controlling the opening cross-sections of the warm air and cold air inflow openings, wherein the cold-air inflow opening extends over an upper and lower area of the mixed-air outflow openings, the at least one closing member for the cold-air inflow opening being constructed in two parts including an upper closing member part for completely covering an upper dimension area of the cold air inflow opening and stopping flow therethrough and a lower closing member part for completely covering a lower dimension area of the cold air inflow opening and stopping flow therethrough; and
controlling the two closing member parts such that the lower closing member part covers a larger opening cross-section of the cold-air inflow opening than the upper closing member part in every position of the at least one closing member.

11. An apparatus for mixing warm and cold air in a ventilation system for ventilating an occupant compartment of a vehicle, comprising:
a climatic box in a ventilation system, the climatic box including:
a heat exchanger through which air flows in the climatic box;
at least one air mixing chamber at the rear side of the heat exchanger in an air flow direction, the mixing chamber further comprises;
at least one warm air inflow opening for warm air flowing through the heat exchanger, at least one cold air inflow opening for cold air flowing around the heat exchanger;

at least one outflow opening for mixed air arranged on a bottom of the air mixing chamber for ventilating at least one of a foot space and the rear of the occupant compartment, at least one outflow opening for mixed air arranged on a top of the air mixing chamber for ventilating at least one of the center plane and the head area of the occupant compartment, and at least one closing member for controlling the opening cross-sections of the warm air and cold air inflow openings, wherein the cold-air inflow openings extends over an upper and lower area of the mixed-air outflow openings, the at least one closing member for the cold air inflow opening being constructed in two parts including an upper closing member part for completely covering an upper dimension area of the cold-air inflow opening and stopping flow therethrough and a lower closing member part for completely covering a lower dimension area of the cold-air inflow opening and stopping flow therethrough; and means for controlling the two closing member parts such that the lower closing member part covers a larger opening cross-section of the cold-air inflow opening than the upper closing member part in every position of the at least one closing member.

\* \* \* \* \*